United States Patent
Ross

[11] 3,774,120
[45] Nov. 20, 1973

[54] LASER OSCILLATOR WITH INTRACAVITY AMPLITUDE STABILIZATION MEANS

[76] Inventor: Dieter Ross, Munich, Germany

[22] Filed: Apr. 1, 1971

[21] Appl. No.: 130,538

Related U.S. Application Data

[63] Continuation of Ser. No. 770,733, Oct. 25, 1968, abandoned.

[30] Foreign Application Priority Data
Nov. 3, 1967  Germany............... P 16 14 648.8

[52] U.S. Cl................. 331/94.5, 307/88.3, 250/199
[51] Int. Cl. .......................... H01s 3/10, H01s 3/16
[58] Field of Search................... 331/94.5; 350/150; 250/199; 330/4.3; 307/88.3

[56] References Cited
UNITED STATES PATENTS

| | | | |
|---|---|---|---|
| 3,434,779 | 3/1969 | Damen et al. | 350/160 |
| 3,446,966 | 5/1969 | Peterson | 250/199 |
| 3,497,828 | 2/1970 | Telk et al. | 331/94.5 |
| 3,500,241 | 3/1970 | Bjorkholm | 331/94.5 |
| 3,584,312 | 6/1971 | Statz | 331/94.5 |
| 3,417,346 | 12/1968 | Yatsiv | 331/94.5 |

OTHER PUBLICATIONS

Statz et al., "Problem of Spike Elimination in Lasers" J. App. Phys. 36 (5) May 1965, pp. 1510–1514.
Sonnenberg et al., "Two–Photon Photoelectric Effects in Cs Sb," App. Phys. Lett. 5 (5) Sept. 1964, pp. 95–96.
Garwin, "Analysis of a . . . . Giant–Pulse Laser" IBM J. July 1964, pp. 338–340.
Colles et al., "Direct Measurement of Gain in a Lithium Niobate Parametric Amplifier," App. Phys. Lett. 10, pp. 309–311 (July 1967).
Giordmaine et al., "Optical Parametric Oscillation in $LiNbO$ ," in Physics of Quantum Electronics, McGraw–Hill (New York) 1966, pp. 31–42.

Primary Examiner—David Schonberg
Assistant Examiner—R. J. Webster
Attorney—Hill, Sherman, Meroni, Gross & Simpson

[57] ABSTRACT

A laser amplifier including a pumped active material includes a non-linear absorption filter in series therewith for providing amplitude stabilization of its output radiation.

3 Claims, 4 Drawing Figures

PATENTED NOV 20 1973 3,774,120

INVENTOR
DIETER RÖSS

ATTORNEYS

LASER OSCILLATOR WITH INTRACAVITY AMPLITUDE STABILIZATION MEANS

This is a continuation of Ser. No. 770,733, filed Oct. 25, 1968, and now abandoned.

BACKGROUND OF THE INVENTION

1. Field of the Invention

This invention relates to optical molecular amplifiers and in particular to apparatus for stabilizing the radiation of a laser amplifier.

2. Description of the Prior Art

In optical amplifiers the pump has the task of inverting the energy levels of the active material involved in an energy transfer regarding the occupation number of the energy levels and the task of stimulating the active material to provide a stimulated emission. The stimulation of emission is thereby favored and/or controlled to a large extent by the optical resonator tuned to the frequency of emission.

Theoretically, the number of operational modes available in the resonator is infinitely high. In reality, however, only a limited number of axial and transverse modes develop, whereby the major share of the energy representing these modes is limited to the basic mode. The modes of a higher order develop individually and depend upon the design of the resonator and the type and the geometric dimensions of the active material. Even additional building components often housed in the resonator may have a bearing effecting the development of operational modes. For example, it is customary to place into the resonator, in addition to the active material, an optical quality switch, preferably in the form of a saturable absorption filter, with the aid of which the impulse output such an arrangement can deliver can be increased considerably, among other factors.

Minor variations of the dimensions of the active material due to thermal variations, to changes at the surface of the mirror representing the resonator, to inevitable fluctuations in the supply of energy to the pump source and due to other factors influence the development of the modes in the resonator to a large extent, and thereby have a bearing upon the amplitude and upon the energy of the radiation to be delivered to the outside by the release means. To be specific, in many laser arrangements such variations cause violent relaxation oscillations which have a detrimental influence in many applications.

SUMMARY OF THE INVENTION

The present invention overcomes the above problem by providing a molecular amplifier having a stabilized amplitude of output radiation.

According to the invention, an optical molecular amplifier comprises an active material arranged along with an absorbing material within an optical reactor equipped with a release means and a pump means for the active material. The stabilization of the amplitude of the output radiation is provided by an absorption filter which is dimensioned at least within the spectral range of the induced emission for an absorption which increases with increasing energy density of the output radiation.

One absorption filter whose absorption increased with increasing incoming energy is described in the periodical "IBM Journal of Research and Development," Oct., 1963, vol. 7, pages 334–336. In addition, it is also known to use an absorption filter for providing an optical isolator as described in German DAS published U.S. Pat. application No. 1,228,338.

The present invention is based on the discovery that the introduction of such an absorption filter into the resonator of an optical molecular amplifier offers, in an extremely advantageous manner, the possibility of an amplitude stabilization of its initial or output radiation.

Any material is appropriate for the realization of an absorption filter, whose absorption increases with growing energy density, if it has at least two transfers and/or two pairs of energy levels whose frequency distances, related to the frequency of the induced emission, are in a harmonic relation to each other.

Also, according to the invention, a non-linear frequency modulator may be provided. For example, this non-linear frequency modulator may be, when using an yttrium-aluminum garnet doped with neodymium, as an active material, a body of lithium niobate. The wave length of the stimulated emission generated in the active material of such a composition amounts to 1.06 microns, which upon passage through the lithium niobate body is modulated into a wave length of 0.503 microns. The frequency of modulation is afflicted with a loss in energy which increases with growing energy of the radiation fed to the non-linear frequency modulator, so that such an arrangement has a stabilizing influence upon the amplitude of the output radiation as provided by a negative feedback.

The use of a quality switch in the resonator, as applied for example in giant impulse lasers, where it is frequently a selectively saturable absorption filter, supports like a positive feedback, the amplitude fluctuations of the laser output radiation of an interfering nature and present, as such, because of an increase or decrease of the energy of the stimulated emission, an increase in the amplitude fluctuations of the output radiation by the saturation phenomena of the absorption filter varying in the same direction. The selectively saturable properties of such an absorption filter, however, offer the advantage on the other hand that they have an effect in the direction of a frequency stabilization upon arrangement.

In another embodiment of the invention this frequency-stabilizing effect of such a selectively saturable absorption filter is employed in a dual role by simultaneously assuring the amplitude stabilization of the laser output radiation in that the laser resonator in addition to a non-linear absorption characteristic includes a second absorption filter arranged in the range of the frequency of the induced emission. Thereby the first absorption filter is dimensioned to compensate for the saturation pheonomena of the second absorption filter.

Figure 1:
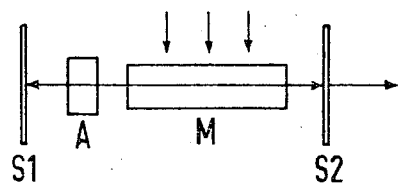
FIG. 1 is a schematic representation of a molecular amplifier according to the principles of the present invention.

The molecular amplifier according to FIG. 1 comprises a pumped active material M arranged in series with an absorption filter A in the optical axis of a resonator comprising two plane-parallel mirrors S1 and S2. The mirror S1 is fully reflecting while the mirror S2 is partially translucent to a small extent for release of the laser radiation. According to the invention, the absorption filter A is a non-linear absorbent material which at least in the spectral range of the induced emission is dimensioned for an absorption which increases with increasing energy density of the radiation.

Figure 2:
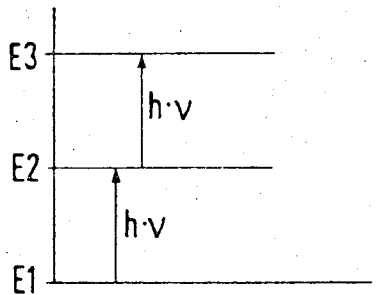
FIG. 2 is an energy level diagram for an absorption filter according to the principles of the present invention.

These properties of the absorption filter can be achieved in a particularly simple manner with a material whose energy level diagram corresponds to the one shown in the diagram of FIG. 2. The energy level diagram according to FIG. 2 provides three energy levels E1, E2, and E3, of which energy level E1 represents the basic level. The distance between energy level E1 and energy level E2 on the one hand and energy level E2 and energy level E3 is identical in both cases and has the value $h \cdot v$, wherein in h is the Planck's action quantum and v is the frequency corresponding to the distance. A material of this kind is carbon dioxide gas ($CO_2$), for example, which, as is known, has a multiplicity of rotation oscillations. The non-linear absorption properties become particularly favorable, if the material shows, with reference to its two transfers, approximately identical frequency distances, and has in addition, a differential action cross-section, preferably a highly differential action cross-section. This connection can quickly be appreciated by means of the following deliberations.

Without radiation $N1 = NO$, $N2 = N3 = 0$ applies for the occupation numbers N1, N2, and N3 for the three energy levels E1, E2 and E3.

For the action cross-section we assume $\sigma 21 << \sigma 32$ (for example $\sigma 32 = 10^2 \sigma 21$).

Thus the absorption coefficient $\alpha$ is figured with $\alpha$ [$cm^{-1}$] $= \sigma 21 (N1 - N2) + \sigma 32 (N2 - N3)$. At low radiation output we have $N2 << N1$ (for example $N2 = 10^{-4} N1$) and for the absorption coefficient $\alpha 1$ there applies at low radiation performance $\alpha 1 = \sigma 21 N1 + \sigma 32 N2 \approx \sigma 21 N1 + \sigma 21 NO$ In agreement with a differential action cross-section at a high radiation output, the transfer E2—E1 should go into saturation, which signifies $N2=N1$.

Regarding the transfer E2 → E3 on the other hand the relaxation properties should admit no saturation, which signifies $N3 << N2$.

For the absoprtion coefficient $\alpha$ 2 there applies then the expression $\alpha 2 = \sigma 32 N2 \approx \sigma 32 NO/2$.

Thus, the results for the absorption coefficient $\alpha 2$ at radiation 50 times the value of the absorption coefficient $\alpha 1$ at small radiation output. The absorption coefficient thus rises with growing energy density. The non-linear process responsible therefor is the saturation in the transfer E2 → E1.

Figure 3:
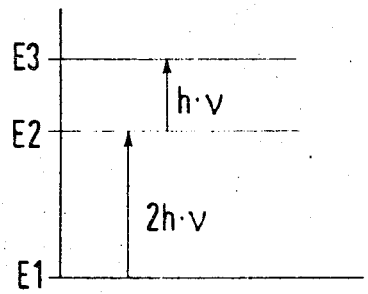
FIG. 3 is another energy level diagram for an absorption filter according to the principles of the present invention.

Similar conditions can be realized in many atomic systems with more than two energy levels. Such materials are particularly appropriate where the frequency distances of at least two transfers or energy level pairs are in a relation of integers to the frequency of the induced emission. A simple energy diagram is shown in the diagram of FIG. 3. The non-linear absorbing material again consists of three energy levels E1, E2 and E3, of which the energy level E1 represents the basic level and where the frequency distances between energy level pair E1-E2 ($2h \cdot v$) have a relation to the induced emission of 1:1 and 1:2. The absorption rise with increasing energy density is brought about by the fact that under the influence of the radiation "two-quantum-processes" take place. In other words, the induced emission with frequency v not only stimulates the transfer of atoms of energy level E2 to energy level E3, but also the transfer of atoms in the direction of E1 → E2, although with much lesser probability. Because with an absence of radiation for the occupation numbers N1, N2 and N3 of the three energy levels E1, E2 and E3, there again applies the expression $N1 = NO$, $N2 = N3 = 0$, accordingly, an absorption can only take place in the transfer E2 → E3 when the transfer E1 → E2 ($2h \cdot v$) has led in the course of the inward radiation of the stimulated emission with frequency v to a however very slight occupation of the energy level E2. Thus the much stronger absorption of the "one-quantum process" becomes effective in the transfer E2 → E3. Because in the one-quantum process the absorption is proportional to the energy density of the radiation, yet in the two-quantum process it is proportional to the square of the energy density, the absorption of both transfers augments due to this non-linearity with increasing energy density.

Another possibility of realzing an absorption filter according to FIG. 1 resides in the already described non-linear frequency doubler. Materials with at least two pairs of energy levels whose frequency distances are differential and have a harmonic relation to the frequency of the induced emission exist in a wide variety, since basically such transfers occur according to the quantum mechanics in every substance. For the sake of completeness, reference is made in this connection to the "Physical and Chemical Tables" and "Figure and Function Values of Physics and Chemistry" published by Landold and Bornstein.

The desired properties of a non-linearly absorbing material with at least two pairs of energy levels whose frequency distances differ and have a harmonic relation to the induced emission can thus be controlled simply and advantageously by assigning to the absorption filter an auxiliary pump source dimensioned for the pumping of an energy level involved in the absorbing transfers to control one or several absorbing transfers. When applied to the energy level diagram according to FIG. 3, this means that by means of the auxiliary pump's force the transfer E1 → E2 is pumped so that in function of this pumping operation, the absorption of the transfer E2 → E3 can be controlled. If this absorption filter consists of a semi-conductor or a gas, the pumping operation can take place in the form of a flow of current through the semi-conductor and/or through the gas discharge. An influence of light upon a gas, a semi-conductor or a crystal is also possible.

Figure 4:
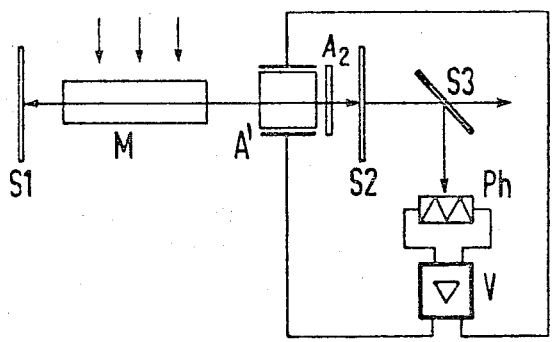
FIG. 4 is an additional embodiment of a molecular amplifier according to the invention.

An embodiment of this kind for a molecular amplifier according to the invention is shown diagrammatically in FIG. 4. In the drawing, a pumped active material M is connected in series with a controllable absorption A' and two-parallel-plane mirrors S1 and S2. Behind the partly translucent mirror S2, an additional partly translucent mirror S3 is located in the direction of radiation and inclined in relation to the direction of radiation at a 45° angle. A small part of the originating laser ray is deflected at the mirror S3 perpendicularly to the direction of radiation and delivered to a photo diode Ph connected to the input of an amplifier V. The output of the amplifier V is connected to the electrodes of the absorption filter A', which is designed here to be electrically controllable. The control circuit for the control of absorption filter A' is so dimensioned in the direction of a negative feedback that with rising amplitude of the laser output ray the controllable absorption filter A' is controlled for an increasing absorption and vice-versa.

In the embodiments according to FIGS. 1 and 4 it is possible to add an additional selectively saturable absorption filter A2 for improving the frequency stability of the amplifier which must be arranged in series with the active material M and the absorption filter A and/or A' in the resonator. Many other changes and modifications of the invention will be apparent to those skilled in the art without departing from the spirit and scope of the invention as set forth in the appended claims.

I claim as my invention:

1. An optical amplifier for amplitude stabilization of laser radiation comprising:
    a. an active laser medium;
    b. excitation means optically coupled to said active medium for exciting said medium to produce a population inversion therein;
    c. an optical resonant cavity disposed about said active medium for stimulating the emission of radiation therefrom and for coupling a coherent output beam of radiation from said cavity;
    d. a non-linear absorber means for changing the frequency of radiation to a harmonic frequency comprising lithium niobate ($LiNbO_3$) having a controllable multi-photon absorption characteristic which is at least within the spectral range of said radiation for amplitude stabilization of said radiation, placed in said resonator in series with said active medium and said resonator;
    e. negative feedback control means comprising:
        1. means for sampling a portion of said output beam;
        2. detector means for receiving said sample portion of said output beam and for generating energy proportional to the intensity of said sample portion,
        3. circuit means for coupling said generated energy to said means having the controllable multi-photon absorption characteristic for increasing its absorption of said radiation as the intensity of said sampled output beam increases, and thus, for imparting a stabilizing influence on the amplitude of said output radiation.

2. An optical molecular amplifier according to claim 1 which further comprises:
    another absorbing medium placed in said cavity in series with said non-linear absorber, said another absorbing medium having selectively saturable absorption characteristics in the frequency range of said harmonic radiation for providing the frequency stability of the amplifier.

3. An optical amplifier for amplitude stabilization of laser radiation comprising:
    a. an active laser medium;
    b. excitation means optically coupled to said active medium for exciting said medium to produce a population inversion therein;
    c. an optical resonant cavity disposed about said active medium for stimulating the emission of radiation therefrom and for coupling a coherent output beam of said radiation from said cavity;
    d. a non-linear absorber means for changing the frequency of radiation to a harmonic frequency having a controllable multi-photon absorption characteristic which is at least within the spectral range of said radiation and controlled for amplitude stabilization of said radiation, placed in said resonator in series with said active medium and said resonator;
    e. negative feedback control means comprising
        1. means for sampling a portion of said output beam;
        2. detector means for receiving said sample portion of said output beam and for generating energy proportional to the intensity of said sample portion,
        3. circuit means for coupling said generated energy to said means having the controllable multi-photon absorption for increasing its absorption characteristic of said radiation as the intensity of said sampled output beam increases, and thus, for imparting a stabilizing influence on the amplitude of said output radiation.

* * * * *

UNITED STATES PATENT OFFICE
CERTIFICATE OF CORRECTION

Patent No. 3,774,120  Patent Dated November 20, 1973

Inventor(s) Dieter Röss

It is certified that error appears in the above-identified patent and that said Letters Patent are hereby corrected as shown below:

On the Abstract Page, "[72] Dieter Ross" should read --[72] Dieter Röss--; and an item [73] should appear and read --[73] assignee Siemens Aktiengesellschaft, Berlin and Munich, Germany--.

Signed and sealed this 31st day of December 1974.

(SEAL)
Attest:

McCOY M. GIBSON JR.
Attesting Officer

C. MARSHALL DANN
Commissioner of Patents